United States Patent
Cancio et al.

(10) Patent No.: US 11,275,452 B2
(45) Date of Patent: Mar. 15, 2022

(54) KEYBOARD INPUT EMULATION

(71) Applicant: Google LLC, Mountain View, CA (US)

(72) Inventors: Zachary Cancio, San Francisco, CA (US); Brian De Vries, San Francisco, CA (US); Parag Ladhawala, Mountain View, CA (US); Krishna Kishore Kollipara, San Francisco, CA (US); Curtis Steeves, Oakland, CA (US); Daniel Crosby, San Francisco, CA (US); Ankit Prasad, San Francisco, CA (US)

(73) Assignee: GOOGLE, LLC, Mountain View, CA (US)

( * ) Notice: Subject to any disclaimer, the term of this patent is extended or adjusted under 35 U.S.C. 154(b) by 0 days.

(21) Appl. No.: 17/034,824

(22) Filed: Sep. 28, 2020

(65) Prior Publication Data

US 2021/0011558 A1    Jan. 14, 2021

Related U.S. Application Data

(63) Continuation of application No. 16/034,908, filed on Jul. 13, 2018, now Pat. No. 10,788,898.

(Continued)

(51) Int. Cl.
*G06F 3/02*    (2006.01)
*G06F 3/023*    (2006.01)

(52) U.S. Cl.
CPC .......... *G06F 3/023* (2013.01); *G06F 3/0219* (2013.01)

(58) Field of Classification Search
None
See application file for complete search history.

(56) References Cited

U.S. PATENT DOCUMENTS

| 5,045,994 A | 9/1991 | Belfer et al. |
| 5,214,785 A | 5/1993 | Fairweathee |

(Continued)

FOREIGN PATENT DOCUMENTS

| CN | 102729661 | 10/2012 |
| CN | 103116481 | 5/2013 |

(Continued)

OTHER PUBLICATIONS

Mullins, "Exploring the anatomy of a data packet—TechRepublic", Jul. 2, 2001,, https://www.techrepublic.com/article/exploring-the-anatomy-of-a-data-packet, retrieved on Sep. 26, 2018, 14 pages.

(Continued)

*Primary Examiner* — Elias Mamo
(74) *Attorney, Agent, or Firm* — Dority & Manning, P.A.

(57) ABSTRACT

A computing device receives a response comprising one or more data sets corresponding to an identifier. The computing device identifies a first data set identifier in the response that signals the beginning of a first data set and edits the first data set to comprise a first keyboard stroke entry prefix understood by a second computing device as defining the first data set as a first particular type of data and a keyboard stroke entry suffix understood by the second computing device as defining an end of the first data set. The computing device identifies and edits a second data set. The edited first and second data sets are transmitted to the second computing device, where it processes the data sets based on the keyboard stroke entry prefixes and recognizes the end of the data sets based on the keyboard stroke entry suffix.

20 Claims, 4 Drawing Sheets

Related U.S. Application Data

(60) Provisional application No. 62/570,820, filed on Oct. 11, 2017.

(56) References Cited

U.S. PATENT DOCUMENTS

| | | | |
|---|---|---|---|
| 5,576,734 | A | 11/1996 | Daniele et al. |
| 5,793,356 | A | 8/1998 | Svancarek et al. |
| 6,664,982 | B1* | 12/2003 | Bi .................... H04L 67/06 345/169 |
| 6,968,462 | B2 | 11/2005 | Challener et al. |
| 8,265,396 | B2* | 9/2012 | Bauchot ............ G06F 3/0489 382/187 |
| 9,122,810 | B2 | 9/2015 | Hormuth et al. |
| 9,772,956 | B2 | 9/2017 | Christian et al. |
| 9,811,480 | B2 | 11/2017 | Christian et al. |
| 2004/0078503 | A1* | 4/2004 | Zaudtke ............ H04L 67/36 710/72 |
| 2013/0285913 | A1* | 10/2013 | Griffin ............... G06F 3/0237 345/168 |
| 2015/0160855 | A1* | 6/2015 | Bi .................... G06F 3/0236 715/773 |
| 2017/0017940 | A1 | 1/2017 | Lee et al. |
| 2018/0307327 | A1 | 10/2018 | Tran et al. |

FOREIGN PATENT DOCUMENTS

| | | |
|---|---|---|
| CN | 104933547 | 9/2015 |
| CN | 106504042 | 3/2017 |
| WO | WO2017/015138 | 1/2017 |

OTHER PUBLICATIONS

International Search Report and Written Opinion for PCT/US2018/042152, dated Oct. 5, 2018, 15 pages.

* cited by examiner

KEYBOARD INPUT EMULATION

CROSS-REFERENCE TO RELATED APPLICATION

This patent application is a continuation of U.S. patent application Ser. No. 16/034,908, filed Jul. 13, 2018 and entitled "Keyboard Input Emulation," which claims priority to U.S. Patent Application No. 62/570,820, filed Oct. 11, 2017 and entitled "Keyboard Input Emulation." Applicant claims priority to and the benefit of each of the above-identified patent applications and hereby fully incorporates each of such applications herein by reference.

TECHNICAL FIELD

The technology disclosed herein relates creation of data inputs that emulate keyboard entries.

BACKGROUND

Near field communication ("NFC") technology is a standards-based wireless communication technology that allows data to be exchanged between devices that are positioned within a certain predefined proximity of one another. NFC-enabled devices have traditionally been provisioned with special hardware and applications to enable the transfer of sensitive data. However, it is often very difficult to change the manufactured hardware of certain types of computing devices that may not be NFC-enabled.

Additionally, programming of these computing devices requires specific keyboard stroke entries to process different types of data sets. Traditionally a computing device operator is required to manually press a button or enter a set of keyboard strokes to signal the beginning and end of each type of data set entered. Accordingly, there is a need to enable the exchange of data with these computing device from NFC-enable devices and to emulate the manual keyboard inputs.

SUMMARY

Techniques herein provide computer-implemented methods to emulate keyboard entries. In an example, a computing device establishes a wireless communication channel with a mobile computing device. The computing device transmits an identifier to a mobile computing device and receives, from the mobile computing device, a response comprising one or more data sets corresponding to the identifier. The computing device identifies a first data set identifier in the response that signals the beginning of a first data set. The computing device edits the first data set to comprise (1) a first keyboard stroke entry prefix understood by a second computing device as defining the first data set as a first particular type of data and (2) a keyboard stroke entry suffix understood by the second computing device as defining an end of the first data set. The computing device identifies a second data set identifier in the response that signals the beginning of a second data set and edits the second data set to comprise (1) a second keyboard stroke entry prefix understood by the second computing device as defining the second data set as a second particular type of data and (2) the keyboard stroke entry suffix understood by the second computing device as defining an end of the second data set. The computing device transmits the edited first data set and the edited second data set to the second computing device, wherein the second computing device (1) processes the first data set based on the first keyboard stroke entry prefix, (2) recognizes the end of the first data set based on the keyboard stroke entry suffix, (3) processes the second data set based on the second keyboard stroke entry prefix, and (4) recognizes the end of the second data set based on the keyboard stroke entry suffix.

In certain other example aspects described herein, systems and computer program products to emulate keyboard entries are provided.

These and other aspects, objects, features, and advantages of the examples will become apparent to those having ordinary skill in the art upon consideration of the following detailed description of illustrated examples.

DETAILED DESCRIPTION OF THE EXAMPLES

Overview

Figure 1:
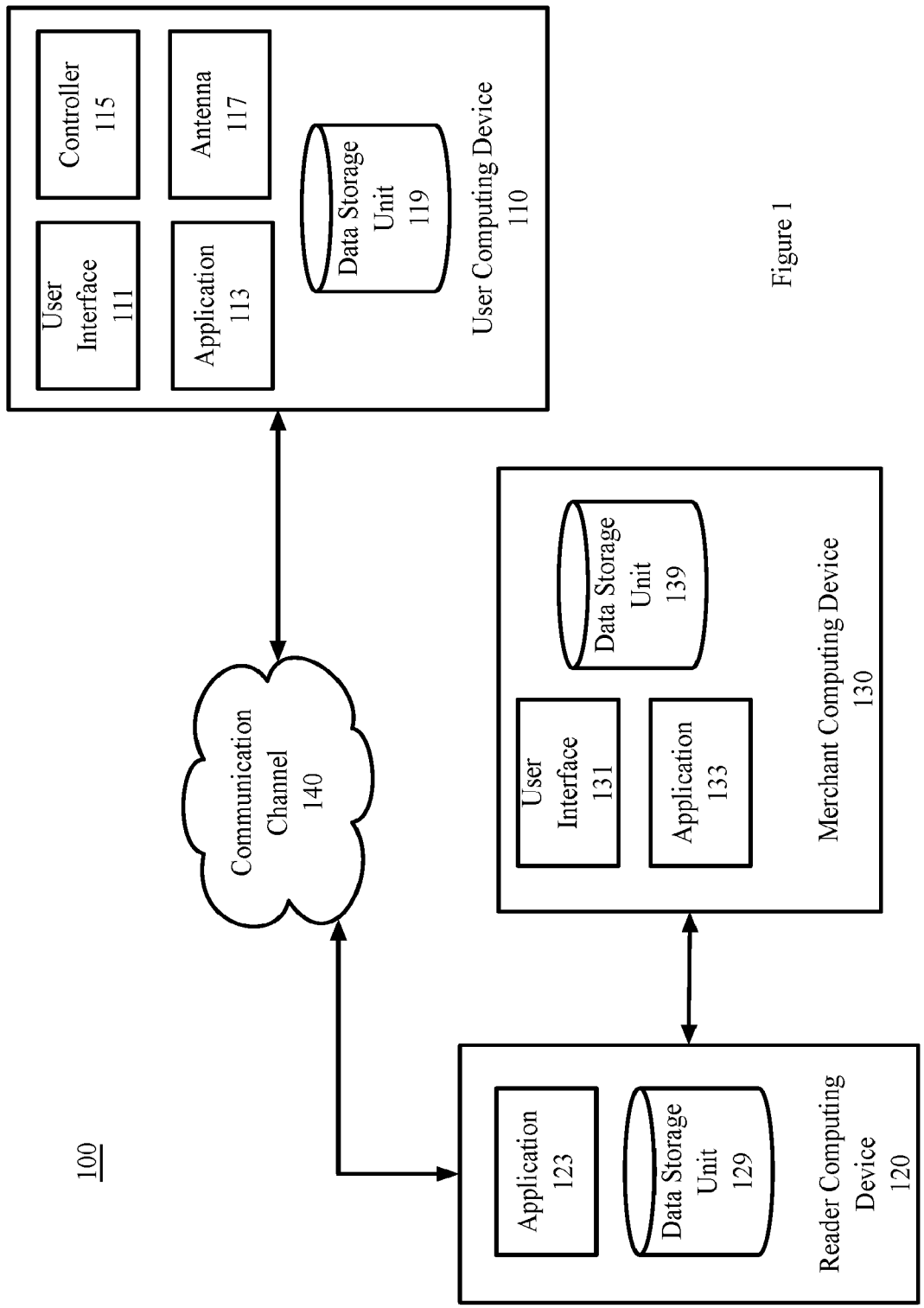
FIG. 1 is a block diagram depicting a system to emulate keyboard entries, in accordance with certain examples.

The examples described herein provide computer-implemented techniques for keyboard emulation. In an example, a reader computing device is communicatively connected to a merchant computing device. An example reader computing device is capable of communicating one or more of loyalty information, offers, gift card account information, payment information, and other transaction-related information received from a user computing device to the merchant computing device. In an example, the reader computing device processes the data received from the user computing device to extract sets of data and convert the extracted data to data understood by the merchant computing device. The example conversion process comprises entry of keyboard codes that emulate keyboard strokes entered by a cashier or merchant system operator into the merchant computing device.

In an example, the user computing device is placed within a pre-defined threshold distance of the reader computing device and a wireless communication channel is established, through which application protocol data unit ("APDU") commands and responses are exchanged. In an example, the reader computing device transmits an APDU command to the user computing device through the communication channel. An example APDU command comprises a compatibility code. The user computing device receives the APDU compatibility code command and transmits an APDU compatibility response to the reader computing device. In an example the APDU compatibility command-response pair confirms the user computing device is capable of communicating with the reader computing device. In an example, the reader computing device receives the APDU compatibility response and transmits an APDU identifier command to the user computing device.

In an example, the user computing device receives the APDU identifier command and identifies loyalty information, offers, gift card account information, or other merchant-related information that corresponds to the identifier contained within the APDU identifier command. In an example, the user computing device prepares an APDU identifier response that comprises the identified information. An example APDU identifier response comprises the loyalty information, offers, gift card account information, or other merchant-related information that corresponds to the identifier contained within the APDU identifier command. In an example, the user computing device transmits the APDU identifier response to the reader computing device. In an example, the reader computing device receives the APDU identifier response and the user computing device is removed from the predefined threshold distance of the reader computing device. In an example, reader computing device processes the received APDU identifier response. For example, the reader computing device parses the received data to identify one or more data sets. In an example, the reader computing device identifies a set of data by evaluating the way the data is formatted. In an example, the reader computing device reads the APDU identifier response and extracts each data set identified.

In an example, the reader computing device edits the extracted data sets. In an example, the merchant computing device requires one or more keyboard stroke entries to recognize the data as loyalty account information, offer information, and/or gift card information. For example, during normal entry of the loyalty account information, offer information, and/or gift card information directly into the merchant computing device, a cashier or merchant operator is required to press a key or button on the merchant computing device that adds a specific prefix before the various types of information. Once the cashier or merchant operator presses the key or button, the merchant computing device will recognize a scanned barcode or keyed in entry that follows the pressing of the key or button as corresponding to a loyalty account, offer, and/or gift card.

In an example, the reader computing device identifies each of the types of data sets extracted and determining the keyboard codes required by the merchant computing device to process the corresponding type of data. The reader computing device emulates the entry of the keyboard stroke (for example, the pressing of the key or button by the cashier or merchant operator) by editing the data set to include the required prefix prior to each type of data. Entry of the edited keyboard strokes prior to the data set signals to the merchant computing device that the data following the entered prefix is a corresponding type of data.

In an example, the merchant computing device requires a specified keyboard stroke to signal the completion of a data set. For example, after normal entry of the data directly into the merchant computing device, a cashier or merchant operator is required to press a key or button on the merchant computing device to signal the completion of the entry of the loyalty account information. Once the cashier or merchant operator presses the key or button, the merchant computing device will understand that the complete data set has been entered. In an example, the reader computing device emulates the entry of the keyboard stroke (for example, the pressing of the key or button by the cashier or merchant operator) by entering a keyboard stroke after the edited loyalty account information.

In an example, the reader computing device extracts more than one type of data set. In this example, the methods are repeated for each different type of data set. Once each data set has been edited, the reader computing device prepares a transmission to the merchant computing device that comprises a listing of the edited identifier response data sets. In this example, the transmission comprises the different loyalty account identifier, offer identifier, gift card account identifier, gift card account password or PIN, or other set of transaction-related information identified from the APDU identifier response and edited to comprise the keyboard emulated strokes so the data sets can be recognized by the merchant computing device.

In an example, the reader computing device is communicatively coupled to the merchant computing device and transmits the listing of edited identifier response data sets to the merchant computing device through a wired or wireless communication channel. The merchant computing device understands the emulated keyboard strokes and can process the data sets without entry of additional buttons or keys by the cashier, user, or merchant operator.

By using and relying on the methods and systems described herein, the keyboard emulation system can function as a hardware add-on device that communicates with a user computing device to receive and edit data in a way that is understandable by a merchant computing device without the need to change the processing capabilities of the merchant computing device. Traditionally, merchant computing device, such as point of sale devices, are manufactured with standard processing capabilities. Changing the standard processing capabilities to communicate with a user computing device is difficult given the wide-spread use of point-of-sale devices and strict ISO guidelines surrounding payment processing. As such, the systems and methods described herein may be employed to permit processing of data from a user computing device without compromising the structure and functioning of the point-of-sale device and without changing the hardware manufactured on the user computing device. Hence providing a plug-in hardware device that operates in connection with the point-of-sale device to edit data received from the user computing device in such a way as to emulate keystrokes traditionally entered by a cashier improves the functioning of the computer and the payment system.

Various examples will be explained in more detail in the following description, read in conjunction with the figures illustrating the program flow.

Turning now to the drawings, in which like numerals indicate like (but not necessarily identical) elements throughout the figures, examples are described in detail.

Example System Architecture

FIG. 1 is a block diagram depicting a system to emulate keyboard entries, in accordance with certain examples. As depicted in FIG. 1, the example operating environment 100 comprises systems 110, 120, and 130 that are configured to communicate with one another via one or more networks or communication channels 140 via computing devices. In another example, two or more of these systems (including systems 110, 120, and 130) are integrated into the same system. In some examples, a user associated with a device must install an application and/or make a feature selection to obtain the benefits of the techniques described herein.

Each communication channel 140 comprises a wired or wireless telecommunication mechanism by which the systems (including systems 110, 120, and 130) can communicate and exchange data. For example, each communication channel 140 can be implemented as, or may be a part of, a Bluetooth, Bluetooth Low Energy (BLE), near field communication network (NFC), any form of standardized radio frequency, infrared, sound (for example, audible sounds, melodies, and ultrasound), other short range communication channel, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example, each system (including systems 110, 120, and 130) comprises a device having a communication module capable of transmitting and receiving data over the network 140. For example, each network system (including systems 110, 120, and 130) may comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that comprises or is coupled to a web browser or other application for communicating via the communication channel 140. In the example depicted in FIG. 1, the systems (including systems 110, 120, and 130) are operated by users and merchants, respectively.

The merchant computing system comprises at least one merchant computing device 130. An example merchant computing device 133 comprises a user interface 131, an application 133, and a data storage unit 139.

In an example, the merchant computing device 130 is a point of sale (POS) terminal that is capable of processing a purchase transaction initiated by a user, for example, a cash register. In an example, the merchant operates a commercial store and the user indicates a desire to make a purchase by presenting a form of payment at the POS terminal. In another example, the merchant computing device 130 may be a personal computer, mobile device (for example, notebook, computer, tablet computer, netbook computer, personal digital assistant (PDA), video game device, GPS locator device, cellular telephone, Smartphone or other mobile device), television, wearable computing devices (for example, watches, rings, or glasses), or other appropriate technology that comprises or is coupled to a web server (or other suitable application for interacting with web page files) or that comprises or is coupled to an application 133.

The merchant can use the merchant computing device 130 to process a purchase transaction via a user interface 131 and the application 133. For example, the user interface 131 comprises a touch screen, a voice-based interface, or any other interface that allows the merchant to provide input and receive output from the application 133. In an example, the merchant interacts with the application 133 via the user interface 131.

The application 133 is a program, function, routine, applet or similar entity that exists on and performs its operations on the merchant computing device 130. For example, the application 133 may be one or more of a shopping application, merchant computing system application, an Internet browser, a digital wallet application, a loyalty card application, another value-added application, a user interface 131 application, or other suitable application operating on the merchant computing device 130. In some examples, the merchant must install an application 133 and/or make a feature selection on the merchant computing device 130 to obtain the benefits of the techniques described herein.

In an example, the data storage unit 139 may be a separate memory unit resident on the merchant computing device 130. An example data storage unit 139 enables storage of sales data, offer data, loyalty information, and purchase data. In an example, the data storage unit 139 can include any local or remote data storage structure accessible to the merchant computing device 130 suitable for storing information. In an example, the data storage unit 139 stores encrypted information, such as HTML5 local storage.

An example, the merchant computing device 130 is capable of communicating with the reader computing device 120 via the application 133. The application 133 may be an integrated part of the merchant computing device 130 or a standalone hardware device (not shown), in accordance with alternative examples.

In an example, the merchant computing system comprises a reader computing device 120 that is capable of communicating with a user computing device 110 and the merchant computing device 130 via an application 123. An example reader computing device 120 comprises an add-on hardware device that operates in conjunction with the merchant computing device 130. In an example, the reader computing device may be a personal computer, mobile device (for example, notebook, computer, tablet computer, netbook computer, personal digital assistant (PDA), video game device, GPS locator device, cellular telephone, Smartphone or other mobile device), television, wearable computing devices (for example, watches, rings, or glasses), or other appropriate technology that comprises or is coupled to a web server (or other suitable application for interacting with web page files) or that comprises or is coupled to an application 123. In an example, the reader computing device 120 is plugged into or connected to the merchant computing device via a wired or wireless communication channel. In an example, data is communicated from the reader computing device 120 to the merchant computing device 130 via the wired or wireless communication channel.

In an example, the reader computing device 120 is capable of communicating with the user computing device 110 using an NFC communication method. In another example, reader computing device 120 is capable of communicating with the user computing device 110 using a Bluetooth communication method. In yet another example, the reader computing device 120 is capable of communicating with the user computing device 110 using a Wi-Fi communication method.

An example application 123 is a program, function, routine, applet or similar entity that exists on and performs its operations on the reader computing device 120. For example, the application 123 may be one or more of a shopping application, merchant computing system application, a digital wallet application, a loyalty card application, another value-added application, or other suitable application operating on the reader computing device 120.

In an example, the data storage unit 129 may be a separate memory unit resident on the reader computing device 120. An example data storage unit 129 enables storage of sales data, offer data, loyalty information, and purchase data. In an example, the data storage unit 129 can include any local or remote data storage structure accessible to the reader computing device 120 suitable for storing information. In an example, the data storage unit 129 stores encrypted information, such as HTML5 local storage.

In an example, the user requests a purchase, exchange of loyalty data, exchange of offer data, or exchange of gift card data with the merchant computing system. In an example, the exchange is initiated by a wireless "tap" of the user computing device 110 with the reader computing device 120. In an example, a communication channel 140 is established between the reader computing device 120 and the user computing device 110. Data can then be exchanged through the established communication channel 140.

In an example, data received from the user computing device 110 is processed by the application 123 on the reader computing device 120. In an example, the data is processed and at least part of the data is converted to data understood by the merchant computing device 130. Example converted data comprises entry of keyboard codes.

An example user computing device 110 comprises a user interface 111, an application 113, a data storage unit 119, a controller 115, and an antenna 117. In an example, the user computing device 110 may be a personal computer, mobile device (for example, notebook, computer, tablet computer, netbook computer, personal digital assistant (PDA), video game device, GPS locator device, cellular telephone, Smartphone or other mobile device), television, wearable computing devices (for example, watches, rings, or glasses), or other appropriate technology that comprises or is coupled to a web server (or other suitable application for interacting with web page files) or that comprises or is coupled to the application 113.

The user can use the user computing device 110 to communicate with the reader computing device 120 and exchange data via a user interface 111 and an application 113. For example, the user interface 111 comprises a touch screen, a voice-based interface, or any other interface that allows the user to provide input and receive output from the application 113. In an example, the user interacts with the application 113 via the user interface 111.

The application 113 is a program, function, routine, applet or similar entity that exists on and performs its operations on the user computing device 110. For example, the application 113 may be one or more of a shopping application, merchant computing system application, an Internet browser, a digital wallet application, a loyalty card application, another value-added application, a user interface 111 application, or other suitable application operating on the user computing device 110. In some examples, the user must install an application 113 and/or make a feature selection on the user computing device 110 to obtain the benefits of the techniques described herein.

In an example, the data storage unit 119 and application 113 may be implemented in a secure element or other secure memory (not shown) on the user computing device 110. In another example, the data storage unit 119 may be a separate memory unit resident on the user computing device 110. An example data storage unit 119 enables storage of loyalty data, offers, gift card data, and payment data. In an example, the data storage unit 119 can include any local or remote data storage structure accessible to the user computing device 110 suitable for storing information. In an example, the data storage unit 119 stores encrypted information, such as HTML5 local storage.

In an example, the controller 115 is capable of sending and receiving data, performing authentication and ciphering functions, and directing how the user computing device 110 will listen for transmissions from the merchant computing device 120 or configuring the user computing device 110 into various power-save modes. In another example, the user computing device 110 comprises a Bluetooth controller, Bluetooth low energy ("BLE") controller, or an NFC controller capable of performing similar functions. An example controller 115 communicates with the application 113 and is capable of sending and receiving data over a wireless communication channel 140. In another example, the controller 115 comprises a Bluetooth controller, BLE controller, Wi-Fi controller, or NFC controller that performs similar functions using Bluetooth, BLE, Wi-Fi, or NFC protocols.

In an example, the controller 115 activates the antenna 117 to create a wireless communication channel 140 between the user computing device 110 and the reader computing device 120. For example, the user computing device 110 communicates with the reader computing device 120 via the antenna 117. In an example, when the user computing device 110 has been activated, the controller 115 polls through the antenna 117 a radio signal, or listens for radio signals from the reader computing device 120.

In an example, the antenna 117 is a means of communication between the user computing device 110 and a reader computing device 120. In an example, a controller 115 outputs through the antenna 117 a radio signal, or listens for radio signals from the reader computing device 120.

An example user computing device 110 comprises a secure element or secure memory (not shown), which can exist within a removable smart chip or a secure digital (SD) card, which can be embedded within a fixed chip on the user computing device 110, or be realized as a secure compartment of a security-enhanced operating system. In certain examples, Subscriber Identity Module (SIM) cards may be capable of hosting a secure element, for example, an NFC SIM Card. The secure element allows a software application resident on the user computing device 110 and accessible by the device user to interact securely with certain functions within the secure element, while protecting information stored within the secure element. In another example, the secure element is configured to include a non-EMV type contactless smart card, as an optional implementation. The secure element communicates with the application 113 in the user computing device 110. In an example, the secure element is capable of storing encrypted user information and only allowing trusted applications to access the stored information. In an example, a controller 115 interacts with a secure key encrypted application for decryption and installation in the secure element.

In another example, host card emulation ("HCE") is utilized instead of or in combination with a secure element. In an example, HCE enables the application 113 to offer secure access and processing (for example, payment account and loyalty account) access using cryptographic processing without a physical secure element. Using HCE, data can be securely exchanged between an NFC-enabled reader computing device 120 and the application 113 on the user computing device 110. In an example, this exchange is configured to act or pretend to emulate the functional responses of secure element. In an example, the data request received from the reader computing device 120 is routed to the main operating system (not shown) of the user computing device 110 instead of being routed to a local hardware-based secure element.

Figure 4:
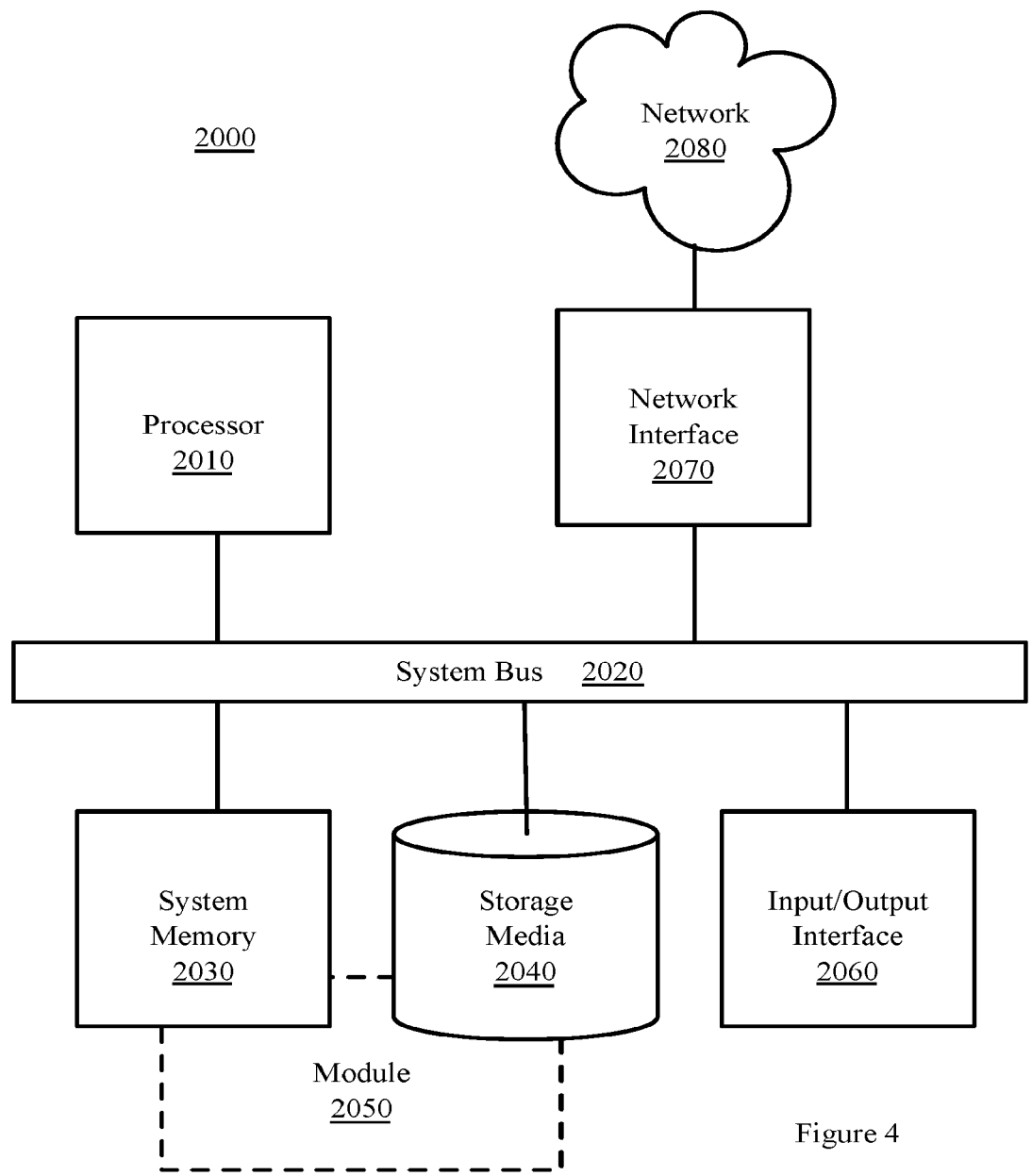
FIG. 4 is a block diagram depicting a computing machine and module, in accordance with certain examples.

In examples, the network computing devices and any other computing machines associated with the technology presented herein may be any type of computing machine such as, but not limited to, those discussed in more detail with respect to FIG. 4. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 4. The computing machines discussed herein may communicate with one another, as well as with other computing machines or communication systems over one or more networks, such as network 2080.

The network 2080 may comprise any type of data or communications network, including any of the network technology discussed with respect to FIG. 4.

Example Process

The components of the example operating environment 100 are described hereinafter with reference to the example methods illustrated in FIGS. 2-3. The example methods of FIGS. 2-3 may also be performed with other systems and in other environments. The operations described with respect to any of the FIGS. 2-3 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.

Figure 2:
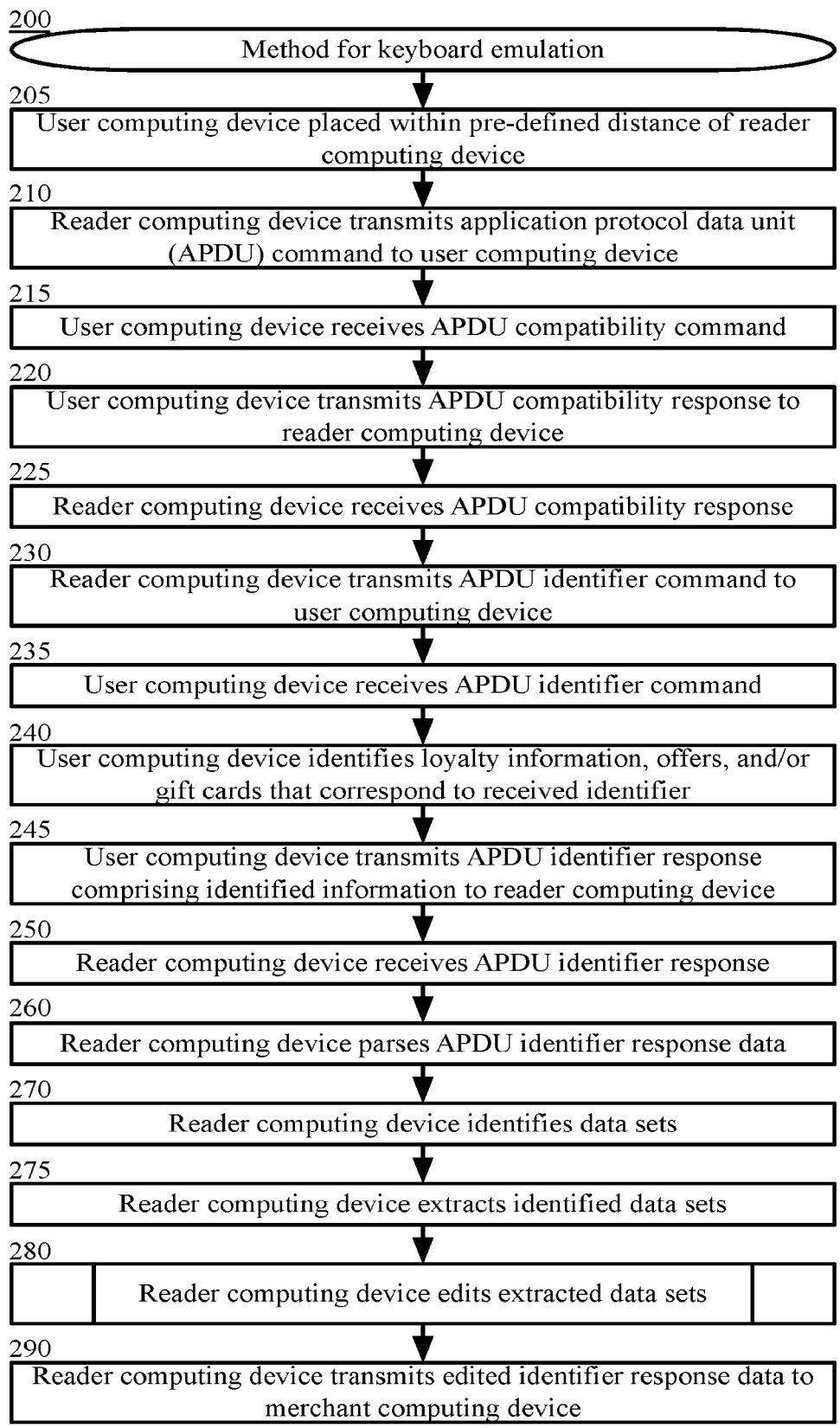
FIG. 2 is a block flow diagram depicting a method to emulate keyboard entries, in accordance with certain examples.

FIG. 2 is a block flow diagram depicting a method 200 to emulate keyboard entries, in accordance with certain examples. The method 200 is described with reference to the components illustrated in FIG. 1. In an example, a reader computing device 120 is communicatively connected to a merchant computing device 130. An example reader computing device 120 is capable of communicating one or more of loyalty information, offers, gift card account information, payment information, and other transaction-related information received from a user computing device 110 to the merchant computing device 130. In an example, the reader computing device 120 processes the data received from the user computing device 110 to extract sets of data and convert the extracted data to data understood by the merchant computing device 130. The example conversion process comprises entry of keyboard codes that emulate keyboard strokes entered by a cashier or merchant system operator into the merchant computing device 130.

In block 205, the user computing device 110 is placed within a pre-define distance of the reader computing device 120. In an example, the placement of the user computing device 110 within the pre-defined threshold distance of the reader computing device 120 comprises a wireless "tap." An example pre-defined threshold distance comprises a physical contact with the reader computing device 120 at an indicated location. In an another example, the pre-defined threshold distance comprises a distance of less than a number of inches, for example less than 4 inches, from an indicated location on the reader computing device 120. An example wireless tap establishes a wireless communication channel 140 through which application protocol data unit ("APDU") commands and responses are exchanged. In an example, the user computing device 110 remains within the pre-defined distance of the reader computing device 120 during the exchange of the APDU command-response pairs. Example APDU command-response pair structure is defined pursuant to ISO standards.

In block 210, the reader computing device 120 transmits an APDU command to the user computing device 110 through the communication channel 140. An example APDU command comprises a compatibility code.

In block 215, the user computing device 110 receives the APDU compatibility code command. In an example, the user computing device 110 receives the APDU compatibility command and an application 113 operating on the user computing device 110 processes the APDU compatibility command to determine if the devices (110 and 120) are compatible. In another example, a processor built in the operating system of the user computing device 110 processes the APDU compatibility command and prepares a APDU compatibility response.

In block 220, the user computing device 110 transmits the APDU compatibility response to the reader computing device 120. In an example the APDU compatibility command-response pair confirms the user computing device 110 is capable of communicating with the reader computing device 120. In an example, the user computing device 110 transmits the APDU compatibility response to the reader computing device 120 through the communication channel 140 while the user computing device 110 is tapped.

In block 225, the reader computing device 120 receives the APDU compatibility response. In an example, the APDU compatibility response confirms the user computing device 110 is capable of communicating with the reader computing device 120.

In block 230, the reader computing device 120 transmits an APDU identifier command to the user computing device 110. An example APDU identifier command comprises an identifier code that corresponds to the merchant system, merchant computing device 130, or other identifier that can be used by the user computing device 110 to identify information that corresponds to the merchant.

In block 235, the user computing device 110 receives the APDU identifier command and routes the command to the core operating system. In an example, host card emulation ("HCE") is built in the operating system of the user computing device 110 to allow the user computing device 110 to securely process and communicate data without using a secure element. In another example, the user computing device 110 routes the APDU identifier command to a secure element, application 113, or other secure hardware to allow the user computing device 110 to process and communicate data with the reader computing device 120.

In block 240, the user computing device 110 identifies loyalty information, offers, coupons, gift card account information, or other merchant-related information that corresponds to the identifier contained within the APDU identifier command. For example, the APDU identifier command comprises an identifier for Merchant X. In this example, the user computing device 110 retrieves a loyalty account identifier for Merchant X, three offers that can be redeemed at Merchant X, Merchant X gift card account information, and Merchant X gift card password or PIN information.

In another example, the APDU identifier command directs the user computing device 110 to identify one or more sets of data for use in a purchase transaction. In yet another example, the APDU identifier command directs the user computing device 110 to identify one or more sets of data for use in an offer redemption or loyalty transaction.

In an example, the user computing device 110 prepares an APDU identifier response that comprises the identified information. An example APDU identifier response comprises the loyalty information, offers, gift card account information, or other merchant-related information that corresponds to the identifier contained within the APDU identifier command.

Continuing with the previous example, the APDU identifier response comprises the loyalty account identifier for Merchant X, the three offers that can be redeemed at Merchant X, the Merchant X gift card account information, and the Merchant X gift card password or PIN information.

In block 245, the user computing device 110 transmits the APDU identifier response to the reader computing device 120. In an example, the APDU identifier response is transmitted to the reader computing device 120 via the communication channel 140 while the user computing device 110 is tapped.

In block 250, the reader computing device 120 receives the APDU identifier response. In an example, the exchange of the APDU identifier response completes the exchange of data between the reader computing device 120 and the user computing device 110. In an example, the reader computing device 120 will display an indicator to signal the completion of the exchange, for example, a green light. In another example, the user computing device 110 will display an indicator to signal the completion of the exchange of data. In an example, the user computing device 110 can be removed from the predefined threshold distance of the reader computing device 120 after the completion of the exchange of data.

In block 260, the reader computing device 120 begins processing the APDU identifier response by parsing the received data to identify one or more data sets. In an example, each data set corresponds to a different loyalty account identifier, offer identifier, gift card account identifier, gift card account password or PIN, or other set of transaction-related information.

In block 270, the reader computing device 120 identifies the one or more data sets. In an example, the reader computing device 120 identifies a set of data by evaluating the way the data is formatted. For example, the reader computing device 120 identifies fixed values, pre-defined prefixes, repeating values, predefine data value lengths, or other identifiers that signal the beginning or end of a data set.

In block 275, the reader computing device 120 extracts each identified data set. In an example, each extracted data set comprises a different loyalty account identifier, offer identifier, gift card account identifier, gift card account password or PIN, or other set of transaction-related information.

In block 280, the reader computing device 120 edits the extracted data sets. The method for editing the extracted APDU identifier response data sets is described in more detail hereinafter with reference to the methods described in FIG. 3. In an example, the reader computing device 120 identifies each of the types of data sets extracted and edits the extracted data set to include a prefix and/or suffix that emulates the entry of keyboard strokes that the merchant computing device 130 requires to recognize the data set.

Figure 3:
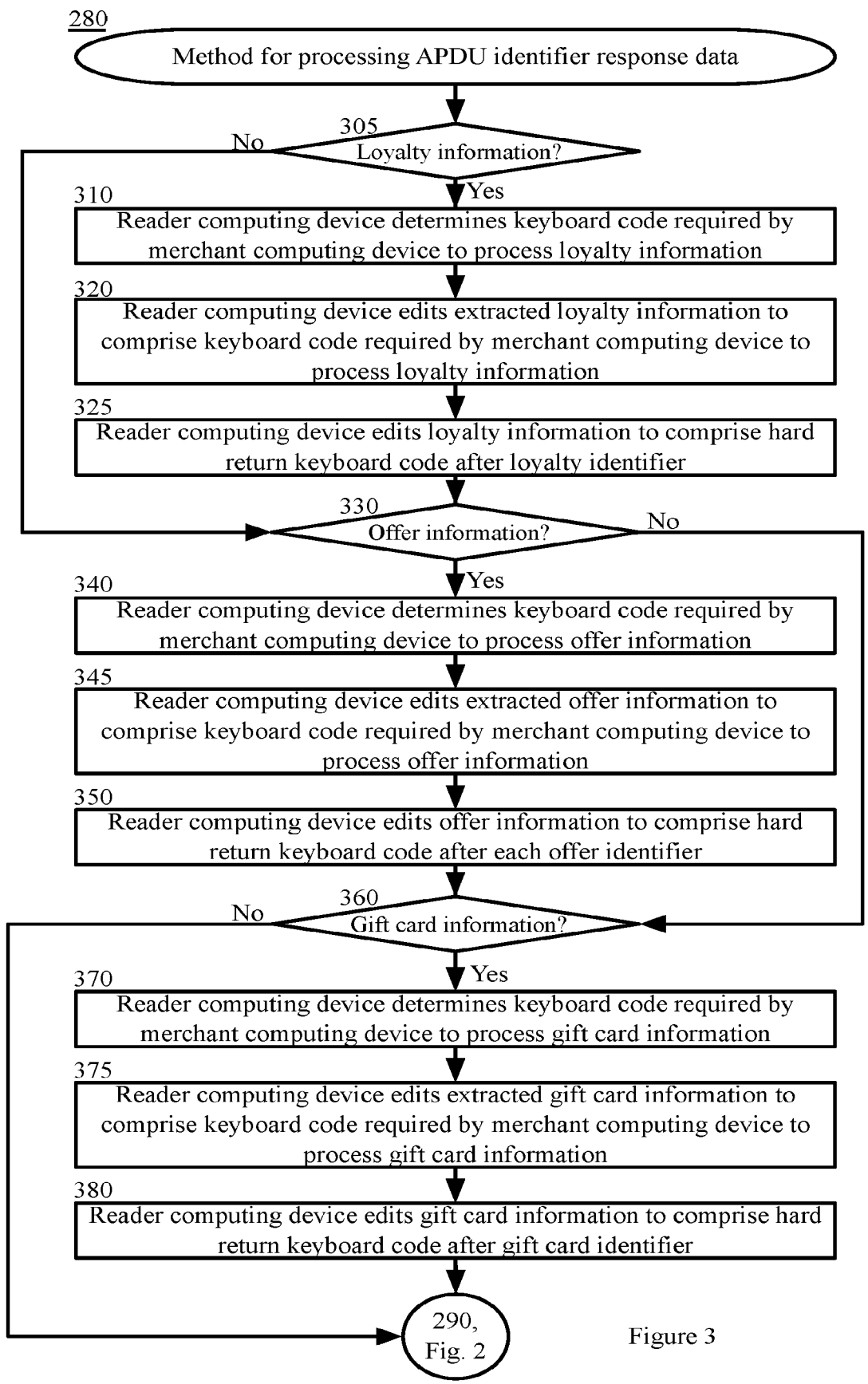
FIG. 3 is a block flow diagram depicting a method to process APDU identifier response data, in accordance with certain examples.

FIG. 3 is a block flow diagram depicting a method 280 to process APDU identifier response data, in accordance with certain examples, as referenced in block 280. The method 280 is described with reference to the components illustrated in FIG. 1.

In block 305, the reader computing device 120 reviews the first extracted data set and determines whether the first extracted data set comprises loyalty account information. In an example, the reader computing device 120 determines whether the first extracted data set comprises loyalty account information by determining whether the data set comprises a predefined amount or listing of numbers.

If the first data set comprises loyalty account information, the method 280 proceeds to block 310. In block 310, the reader computing device 120 determines keyboard codes required by the merchant computing device 130 to process loyalty account information. In an example, the merchant computing device 130 requires one or more keyboard stroke entries to recognize the data as loyalty account information. For example, during normal entry of loyalty account information directly into the merchant computing device 130, a cashier or merchant operator is required to press a key or button on the merchant computing device 130 that adds a specific prefix before the loyalty account information. Once the cashier or merchant operator presses the key or button, the merchant computing device 130 will recognize a scanned barcode or keyed in entry that follows the pressing of the key or button as corresponding to a loyalty account.

In block 320, the reader computing device 120 emulates the entry of the keyboard stroke (for example, the pressing of the key or button by the cashier or merchant operator) by editing the data set to include the required prefix prior to the loyalty account information. For example, the reader computing device 120 identified the loyalty account identifier 1234567890 and extracted the data set 1234567890. Continuing with this example, the reader computing device 120 will enter the keyboard strokes LYL prior to the loyalty account identifier 1234567890. In this example, the edited loyalty account identifier becomes LYL1234567890. Entry of the LYL keyboard strokes prior to the loyalty account identifier signals to the merchant computing device 130 that the data following the LYL prefix is a loyalty account identifier.

In block 325, the merchant computing device 130 requires a specified keyboard stroke to signal the completion of a data set. For example, after normal entry of loyalty account information directly into the merchant computing device 130, a cashier or merchant operator is required to press a key or button on the merchant computing device 130 to signal the completion of the entry of the loyalty account information. Once the cashier or merchant operator presses the key or button, the merchant computing device 130 will that the complete loyalty account information has been entered. In an example, the reader computing device 120 emulates the entry of the keyboard stroke (for example, the pressing of the key or button by the cashier or merchant operator) by entering a keyboard stroke after the edited loyalty account information.

In an example, the required key or button comprises a hard return. Continuing with the previous example, the reader computing device 120 edits the loyalty account information LYL1234567890 to include an [ENTER]. In this example, the edited loyalty account identifier becomes LYL1234567890[ENTER].

In another example, the required key or button comprises a suffix value, for example a "/r", a carriage return, hard return, or semicolon. Continuing with the previous example, the reader computing device 120 edits the loyalty account information LYL1234567890 to include a semicolon. In this example, the edited loyalty account identifier becomes LYL1234567890;.

If the first data set does not comprise loyalty account information, the method 280 proceeds to block 330. In other examples, the reader computing device 120 extracts more than one data set. In this example, the reader computing device 120 identifies the second type of data set extracted.

In block 330, the reader computing device 120 reviews the extracted data set and determines whether the extracted data set comprises offer information. In an example, the reader computing device 120 determines whether the extracted data set comprises offer information by determining whether the data set comprises a predefined prefix or predefined amount or listing of numbers.

If the data set comprises offer information, the method 280 proceeds to block 340. In block 340, the reader computing device 120 determines keyboard codes required by the merchant computing device 130 to process offer information. In an example, the merchant computing device 130 requires one or more keyboard stroke entries to recognize the data as offer information. For example, during normal entry of offer information directly into the merchant computing device 130, a cashier or merchant operator is required to press a key or button on the merchant computing device 130 that adds a specific prefix before each offer. Once the cashier or merchant operator presses the key or button, the merchant computing device 130 will recognize a scanned barcode or keyed in entry that follows the pressing of the key or button as corresponding to an offer.

In block 345, the reader computing device 120 emulates the entry of the keyboard stroke (for example, the pressing of the key or button by the cashier or merchant operator) by editing the data set to include the required prefix prior to the offer. For example, the reader computing device 120 identified the offer AABBCC and extracted the data set AABBCC. Continuing with this example, the reader computing device 120 will enter the keyboard strokes OFF prior to the offer AABBCC. In this example, the edited offer becomes OFFAABBCC. Entry of the OFF keyboard strokes prior to the offer signals to the merchant computing device 130 that the data following the OFF prefix is an offer.

In block 350, the merchant computing device 130 requires a specified keyboard stroke to signal the completion of a data set. For example, after normal entry of an offer directly into the merchant computing device 130, a cashier or merchant operator is required to press a key or button on the merchant computing device 130 to signal the completion of the entry of the offer. Once the cashier or merchant operator presses the key or button, the merchant computing device 130 will that the complete offer has been entered. In an example, the reader computing device 120 emulates the entry of the keyboard stroke (for example, the pressing of the key or button by the cashier or merchant operator) by entering a keyboard stroke after the edited offer information. In an example, the required key or button comprises a hard return. Continuing with the previous example, the reader computing device 120 edits the offer OFFAABBCC to include an [ENTER]. In this example, the edited loyalty account identifier becomes OFFAABBCC[ENTER].

In an example, the reader computing device 120 identifies more than one offer. In this example, the reader computing device 120 edits each offer. For example, the reader computing device 120 identified the offer AAXXZZ and extracted the data set AAXXZZ. Continuing with this example, the reader computing device 120 will enter the keyboard strokes OFF prior to the offer AAXXZZ. In this example, the edited offer becomes OFFAAXXZZ. The reader computing device 120 the edits the offer OFFAAXXZZ to include an [ENTER]. In this example, the edited offer becomes OFFAAXXZZ[ENTER].

If the data set does not comprise an offer, the method 280 proceeds to block 360. In other examples, the reader computing device 120 extracts more than one data set. In this example, the reader computing device 120 identifies the second or third type of data set extracted.

In block 360, the reader computing device 120 identifies a third type of data set extracted. In an example, the reader computing device 120 reviews the extracted data set and determines whether the extracted data set comprises gift card information. In an example, the reader computing device 120 determines whether the extracted data set comprises gift card information by determining whether the data set comprises a predefined prefix or predefined amount or listing of numbers.

If the data set comprises gift card information, the method 280 proceeds to block 370. In block 370, the reader computing device 120 determines keyboard codes required by the merchant computing device 130 to process gift card information. In an example, the merchant computing device 130 requires one or more keyboard stroke entries to recognize the data as a gift card account number and a gift card PIN. For example, during normal entry of gift card information directly into the merchant computing device 130, a cashier or merchant operator is required to press a key or button on the merchant computing device that adds a specific prefix before the gift card account information. Once the cashier or merchant operator presses the key or button, the merchant computing device 130 will recognize a scanned barcode or keyed in entry that follows the pressing of the key or button as corresponding to the gift card account information.

In block 375, the reader computing device 120 emulates the entry of the keyboard stroke (for example, the pressing of the key or button by the cashier or merchant operator) by editing the data set to include the required prefix prior to the information. For example, the reader computing device 120 identified the gift card account identifier as 11110987654321 and extracted the data set 11110987654321. Continuing with this example, the reader computing device 120 will enter the keyboard strokes PAY prior to the gift card account identifier 11110987654321. In this example, the edited gift card account identifier becomes PAY11110987654321. Entry of the PAY keyboard strokes prior to the gift card account identifier signals to the merchant computing device 130 that the data following the PAY prefix is a payment option.

In another example, during normal entry of PIN information directly into the merchant computing device 130, a cashier, user, or merchant operator is required to press a key or button on the merchant computing device 130 that adds a specific prefix before the gift card PIN information. Once the cashier or merchant operator presses the key or button, the merchant computing device 130 will recognize a keyed in entry that follows the pressing of the key or button as corresponding to the gift card account PIN. In an example, the reader computing device 120 emulates the entry of the keyboard stroke (for example, the pressing of the key or button by the cashier or merchant operator) by editing the data set to include the required prefix prior to the information.

For example, the reader computing device 120 identified the gift card account PIN as 5678 and extracted the data set 5678. Continuing with this example, the reader computing device 120 will enter the keyboard strokes PIN prior to the gift card account PIN 5678. In this example, the edited gift card account identifier becomes PIN5678. Entry of the PIN keyboard strokes prior to the gift card account PIN signals to the merchant computing device 130 that the data following the PIN prefix is a payment account PIN.

In block 380, the merchant computing device 130 requires a specified keyboard stroke to signal the completion of a data set. For example, after normal entry of a payment option directly into the merchant computing device 130, a cashier, user, or merchant operator is required to press a key or button on the merchant computing device to signal the completion of the entry of the offer. Once the cashier, user or merchant operator presses the key or button, the merchant computing device 130 will that the complete payment information has been entered. In an example, the reader computing device 120 emulates the entry of the keyboard stroke (for example, the pressing of the key or button by the cashier or merchant operator) by entering a keyboard stroke after the edited gift card information. In an example, the required key or button comprises a hard return. Continuing with the previous examples, the reader computing device 120 edits the gift card information PAY11110987654321PIN5678 to include an [ENTER]. In this example, the edited gift card identifier becomes PAY11110987654321PIN5678[ENTER].

If the data set does not comprise a gift card, the method 280 proceeds to block 290 in FIG. 2.

Returning to FIG. 2, in block 290, the reader computing device 120 prepares a transmission to the merchant computing device 130 that comprises a listing of the edited identifier response data sets. In this example, the transmission comprises the different loyalty account identifier, offer identifier, gift card account identifier, gift card account password or PIN, and/or other set of transaction-related information identified from the APDU identifier response and edited to comprise the keyboard emulated strokes so the data sets can be recognized by the merchant computing device 130. Continuing with the previous examples, the transmission comprises:

LYL1234567890[ENTER]
OFFAABBCC[ENTER]
OFFAAXXZZ[ENTER]
PAY11110987654321PIN5678[ENTER]

In this example, "[ENTER]" instructs a hard return input on the merchant computing device 130. In an example, the reader computing device 120 is communicatively coupled to the merchant computing device 130 and transmits the listing of edited identifier response data sets to the merchant computing device 130 through a wired or wireless communication channel.

In an example, the merchant computing device 130 understands the emulated keyboard strokes and can process the data sets without entry of additional buttons or keys by the cashier, user, or merchant operator. Continuing with the previous example, the merchant computing device 130 recognizes that the transmitted data comprises a loyalty account identifier, two offers, and an gift card with PIN.

In other examples, the merchant computing device 130 does not recognize each data set. For example, the reader computing device 120 transmits a loyalty account identifier, a first offer code, a second offer code, and a gift card code with PIN. In this example, the merchant computing device 130 recognizes the first loyalty account identifier and the first offer code, but then does not recognize a second offer code. In this example, the merchant computing device 130 continues by entering the keyboard emulation of the gift card code with PIN and recognizes the gift card code with PIN.

Other Examples

FIG. 4 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a location of a user cannot be determined. Thus, the user may have control over how information is collected about the user and used by a content server.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A computer-implemented method, comprising:
transmitting, by a first computing device, an identifier to a second computing device;
receiving, by the first computing device and from the second computing device, a response comprising one or more data sets corresponding to the identifier;
generating, by the first computing device, a first data set including a first keyboard stroke entry prefix understood by a third computing device as identifying the first data set and a keyboard stroke entry suffix understood by the third computing device as defining an end of the first data set; and
transmitting, by the first computing device, the first data set to the third computing device, wherein the third computing device processes the first data set based on the first keyboard stroke entry prefix and recognizes the end of the first data set based on the keyboard stroke entry suffix.

2. The computer-implemented method of claim 1, further comprising:
identifying, by the first computing device, a first data set identifier in the response, the first data set identifier signaling a beginning of the first data set.

3. The computer-implemented method of claim 2, wherein generating, by the first computing device, the first data set comprises editing the first data set to comprise the first keyboard stroke entry prefix understood by the third computing device as defining the first data set as a first particular type of data.

4. The computer-implemented method of claim 1, further comprising:
identifying, by the first computing device, a second data set identifier in the response, the second data set identifier signaling a beginning of a second data set; and
generating, by the first computing device, the second data set including a second keyboard stroke entry prefix understood by the third computing device as identifying the second data set as a second particular type of data and the keyboard stroke entry suffix understood by the third computing device as defining an end of the second data set; and
transmitting, by the third computing device, the second data set to the third computing device, wherein the third computing device processes the second data set based on the second keyboard stroke entry prefix, and recognizes the end of the second data set based on the keyboard stroke entry suffix.

5. The computer-implemented method of claim 4, further comprising:
identifying, by the first computing device, a third data set identifier in the response, the third data set identifier signaling the beginning of a third data set;
generating, by the first computing device, the third data including a third keyboard stroke entry prefix understood by the third computing device as identifying the third data set as a third particular type of data and the keyboard stroke entry suffix understood by the third computing device as defining an end of the third data set; and
transmitting, by the first computing device, the third data set to the third computing device, wherein the third computing device processes the third data set based on the third keyboard stroke entry prefix, and recognizes the end of the third data set based on the keyboard stroke entry suffix.

6. The computer-implemented method of claim 1, further comprising:
extracting, by the first computing device, the first data set from the response.

7. The computer-implemented method of claim 1, further comprising:
establishing a wireless communication channel between the first computing device and the second computing device, wherein the identifier is transmitted to the second computing device and the response is received from the second computing device through the wireless computing channel.

8. A computing system, comprising:
one or more processors; and
one or non-transitory computer readable media that collectively store instructions that when executed by the one or more processors cause the one or more processors to perform operations, the operations comprising:
transmitting, by a first computing device, an identifier to a second computing device;
receiving, by the first computing device and from the second computing device, a response comprising one or more data sets corresponding to the identifier;
generating, by the first computing device, a first data set including a first keyboard stroke entry prefix understood by a third computing device as identifying the first data set and a keyboard stroke entry suffix understood by the third computing device as defining an end of the first data set; and
transmitting, by the first computing device, the first data set to the third computing device, wherein the third computing device processes the first data set based on the first keyboard stroke entry prefix and recognizes the end of the first data set based on the keyboard stroke entry suffix.

9. The computing system of claim 8, further comprising:
identifying, by the first computing device, a first data set identifier in the response, the first data set identifier signaling a beginning of the first data set.

10. The computing system of claim 9, wherein generating, by the first computing device, the first data set comprises editing the first data set to comprise the first keyboard stroke entry prefix understood by the third computing device as defining the first data set as a first particular type of data.

11. The computing system of claim 8, further comprising:
identifying, by the first computing device, a second data set identifier in the response, the second data set identifier signaling a beginning of a second data set; and
generating, by the first computing device, the second data set including a second keyboard stroke entry prefix understood by the third computing device as identifying the second data set as a second particular type of data and the keyboard stroke entry suffix understood by the third computing device as defining an end of the second data set; and
transmitting, by the third computing device, the second data set to the third computing device, wherein the third computing device processes the second data set based on the second keyboard stroke entry prefix, and recognizes the end of the second data set based on the keyboard stroke entry suffix.

12. The computing system of claim 11, further comprising:
identifying, by the first computing device, a third data set identifier in the response, the third data set identifier signaling the beginning of a third data set;
generating, by the first computing device, the third data including a third keyboard stroke entry prefix understood by the third computing device as identifying the third data set as a third particular type of data and the keyboard stroke entry suffix understood by the third computing device as defining an end of the third data set; and
transmitting, by the first computing device, the third data set to the third computing device, wherein the third computing device processes the third data set based on the third keyboard stroke entry prefix, and recognizes the end of the third data set based on the keyboard stroke entry suffix.

13. The computing system of claim 8, further comprising:
extracting, by the first computing device, the first data set from the response.

14. The computing system of claim 8, further comprising:
establishing a wireless communication channel between the first computing device and the second computing device, wherein the identifier is transmitted to the second computing device and the response is received from the second computing device through the wireless computing channel.

15. One or more non-transitory computer readable media that collectively store instructions that when executed by one or more processors cause the one or more processors to perform operations, the operations comprising:
transmitting, by a first computing device, an identifier to a second computing device;
receiving, by the first computing device and from the second computing device, a response comprising one or more data sets corresponding to the identifier;
generating, by the first computing device, a first data set including a first keyboard stroke entry prefix understood by a third computing device as identifying the first data set and a keyboard stroke entry suffix understood by the third computing device as defining an end of the first data set; and
transmitting, by the first computing device, the first data set to the third computing device, wherein the third computing device processes the first data set based on the first keyboard stroke entry prefix and recognizes the end of the first data set based on the keyboard stroke entry suffix.

16. The one or more non-transitory computer readable media of claim 15, further comprising:
identifying, by the first computing device, a first data set identifier in the response, the first data set identifier signaling a beginning of the first data set.

17. The one or more non-transitory computer readable media of claim 16, wherein generating, by the first computing device, the first data set comprises editing the first data set to comprise the first keyboard stroke entry prefix understood by the third computing device as defining the first data set as a first particular type of data.

18. The one or more non-transitory computer readable media of claim 15, further comprising:
identifying, by the first computing device, a second data set identifier in the response, the second data set identifier signaling a beginning of a second data set; and
generating, by the first computing device, the second data set including a second keyboard stroke entry prefix understood by the third computing device as identifying the second data set as a second particular type of data and the keyboard stroke entry suffix understood by the third computing device as defining an end of the second data set; and
transmitting, by the third computing device, the second data set to the third computing device, wherein the third computing device processes the second data set based on the second keyboard stroke entry prefix, and recognizes the end of the second data set based on the keyboard stroke entry suffix.

19. The one or more non-transitory computer readable media of claim 18, further comprising:
identifying, by the first computing device, a third data set identifier in the response, the third data set identifier signaling the beginning of a third data set;
generating, by the first computing device, the third data including a third keyboard stroke entry prefix understood by the third computing device as identifying the third data set as a third particular type of data and the keyboard stroke entry suffix understood by the third computing device as defining an end of the third data set; and
transmitting, by the first computing device, the third data set to the third computing device, wherein the third computing device processes the third data set based on the third keyboard stroke entry prefix, and recognizes the end of the third data set based on the keyboard stroke entry suffix.

20. The one or more non-transitory computer readable media of claim 15, further comprising:
establishing a wireless communication channel between the first computing device and the second computing device, wherein the identifier is transmitted to the second computing device and the response is received from the second computing device through the wireless computing channel.

\* \* \* \* \*